(12) United States Patent
Balmakhtar et al.

(10) Patent No.: US 12,363,543 B2
(45) Date of Patent: Jul. 15, 2025

(54) 5G HYPERLEDGER SLICE SECURITY FRAMEWORK

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 34 days.

(21) Appl. No.: 18/397,628

(22) Filed: Dec. 27, 2023

(65) Prior Publication Data

US 2025/0016569 A1    Jan. 9, 2025

Related U.S. Application Data

(62) Division of application No. 17/545,829, filed on Dec. 8, 2021, now Pat. No. 11,902,788.

(51) Int. Cl.
| | |
|---|---|
| H04L 29/06 | (2006.01) |
| H04W 12/08 | (2021.01) |
| H04W 12/48 | (2021.01) |

(52) U.S. Cl.
CPC .......... *H04W 12/48* (2021.01); *H04W 12/08* (2013.01)

(58) Field of Classification Search
CPC .............................. H04W 12/48; H04W 12/08
See application file for complete search history.

(56) References Cited

U.S. PATENT DOCUMENTS

| | | | |
|---|---|---|---|
| 11,902,788 B2 | 2/2024 | Balmakhtar et al. | |
| 2018/0097807 A1* | 4/2018 | Hahn | H04W 12/06 |
| 2019/0182875 A1* | 6/2019 | Talebi Fard | H04W 76/11 |
| 2020/0259896 A1* | 8/2020 | Sachs | H04L 67/12 |
| 2021/0051468 A1* | 2/2021 | Baskaran | H04W 48/16 |

OTHER PUBLICATIONS

Ni et al., "Efficient and Secure Service-Oriented Authentication Supporting Network Slicing for 5G-Enabled IoT", IEEE Journal on Selected Areas in Communications, vol. 36, Issue: 3, Mar. 2018.*
Ni, et al., "Efficient and Secure Service-Oriented Authentication Supporting Network Slicing for 5G-Enabled IoT", IEEE Journal On Selected Areas In Communications, vol. 36, No. 3, Mar. 2018, 14 pages.
Restriction Requirement dated Jul. 11, 2023, U.S. Appl. No. 17/545,829, filed Dec. 8, 2021.
Notice of Allowance dated Oct. 5, 2023, U.S. Appl. No. 17/545,829, filed Dec. 8, 2021.

* cited by examiner

*Primary Examiner* — Morshed Mehedi

(57) ABSTRACT

A method for implementing a slice security zone (SSZ) in a 5G network. The method comprises storing by an SSZ function executing on a first network server an SSZ security profile of the SSZ in a secure storage function, receiving by the SSZ function from a slice management function a slice registration request comprising information relating to a slice security profile of a slice managed by the slice management function, if the slice security profile complies with the SSZ security profile, storing by the SSZ function a slice registration association between the slice and the SSZ in the secure storage function, and sending by the SSZ function to the slice management function a slice registration response comprising information relating to whether the slice was registered in the SSZ.

20 Claims, 11 Drawing Sheets

5G HYPERLEDGER SLICE SECURITY FRAMEWORK

CROSS-REFERENCE TO RELATED APPLICATIONS

This application is a divisional of and claims priority under 35 U.S.C. § 120 to U.S. patent application Ser. No. 17/545,829, filed on Dec. 8, 2021, entitled "5G Hyperledger Slice Security Framework," by Marouane Balmakhtar, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fifth generation (5G) communication networks include network elements connected via wired and wireless communication links. 5G networks typically implement network function (NF) virtualization, in which virtual NFs (VNFs) or container NFs (CNFs) execute on conventional network servers, switches, and storage devices to implement NFs and/or processes. A VNF is typically understood as a virtual machine having its own operating system, while a CNF runs in its own execution environment on an operating system shared with other CNFs. 5G networks also typically implement 'slices,' which multiplex independent virtual networks on a common physical network infrastructure. Each slice may be thought of as an isolated end-to-end network customized to the requirements of a network subscriber or subscriber application.

SUMMARY

In an embodiment, a method for implementing a slice security zone (SSZ) in a 5G network is disclosed. The method comprises storing by an SSZ function executing on a first network server an SSZ security profile of the SSZ in a secure storage function, receiving by the SSZ function from a slice management function a slice registration request comprising information relating to a slice security profile of a slice managed by the slice management function, if the slice security profile complies with the SSZ security profile, storing by the SSZ function a slice registration association between the slice and the SSZ in the secure storage function, and sending by the SSZ function to the slice management function a slice registration response comprising information relating to whether the slice was registered in the SSZ.

In another embodiment, a method for administering a slice security zone (SSZ) in a 5G network is disclosed. The method comprises receiving at an SSZ function executing on a first network server an SSZ communication registration request, the SSZ communication registration request received from a first network function (NF), the SSZ communication registration request comprising an identifier (ID) of the first NF, a first slice ID, a second NF ID, a second slice ID, and a registration communication parameter, determining by the SSZ function whether a registration criterion is met by determining whether a secure storage function includes a first slice registration association between the first slice and the SSZ, a second slice registration association between the second slice and the SSZ, a first NF registration association between the first NF and the SSZ, and a second NF registration association between the second NF and the SSZ, if the registration criterion is not met, sending by the SSZ function a first SSZ registration violation message to a system administration function executing on a second network server, the first SSZ registration violation message including information relating to the SSZ communication registration request and the SSZ function, if the registration criterion is met, determining by the SSZ function whether a security criterion is met by determining whether the registration communication parameter complies with an SSZ security profile of the SSZ, a first slice security profile of the first slice, and a second slice security profile of the second slice that are stored in the secure storage function, if the security criterion is met, storing in the secure storage function a communication registration association comprising the first NF ID, the first slice ID, the second NF ID, the second slice ID, and the registration communication parameter, and sending by the SSZ function an SSZ communication registration response to the first NF.

In yet another embodiment, a method for enforcing a slice security zone (SSZ) in a 5G network is disclosed. The method comprises receiving at an SSZ function executing on a first network server an SSZ communication notification request, the SSZ communication notification request received from a first network function (NF), the SSZ communication notification request comprising a first NF identifier (ID) of the first NF, a second NF ID, and an inter-function communication parameter, determining by the SSZ function whether a secure storage function includes a matching communication registration association comprising the first and second NF IDs and a registration communication parameter with which the inter-function communication parameter is compliant, if the secure storage function does not include the matching communication registration association, sending by the SSZ function an SSZ communication violation message to a system administration function, and if the secure storage function includes the matching communication registration association, sending by the SSZ function an SSZ communication notification response to the first NF.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
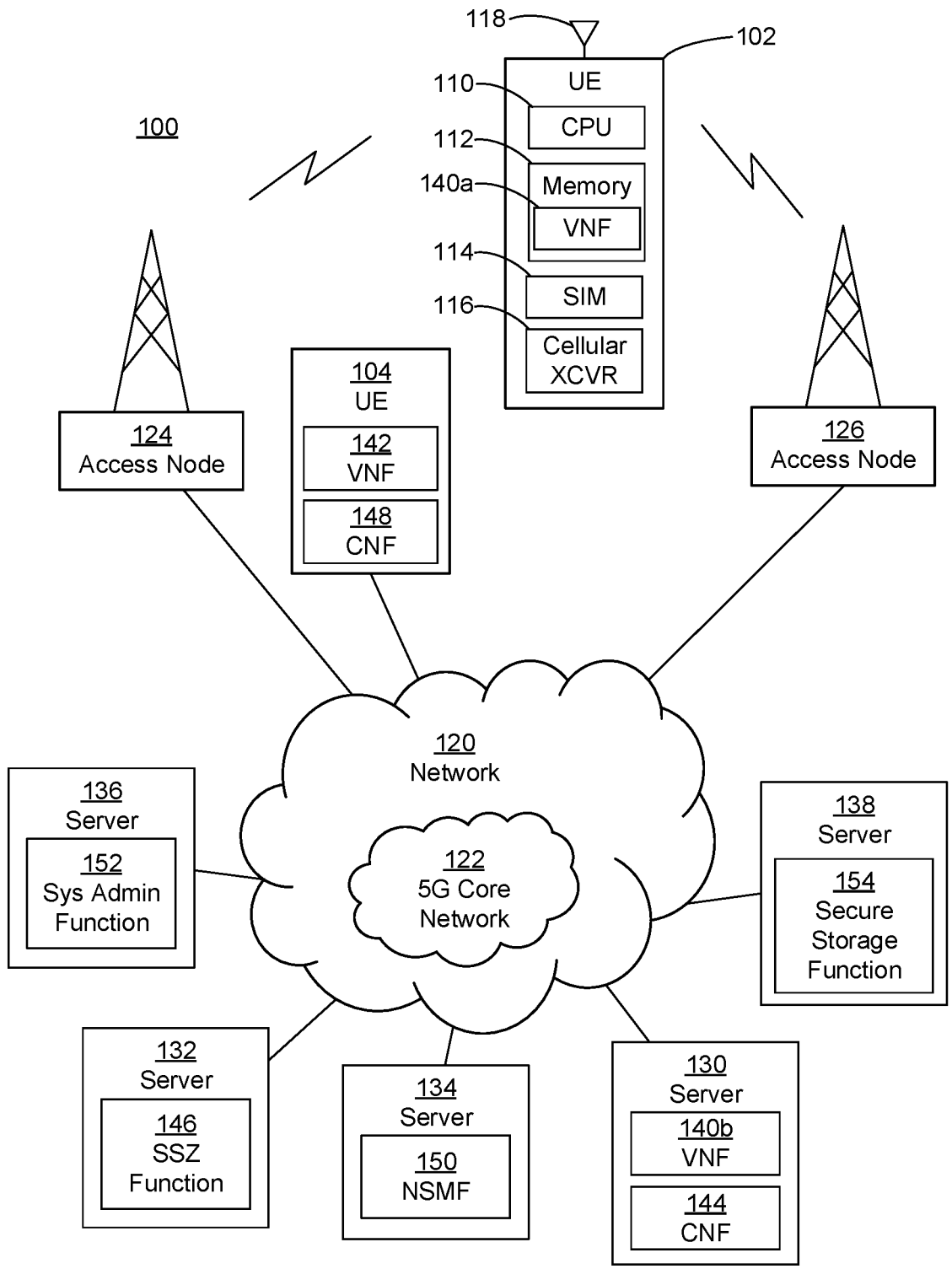
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Applications are being developed to execute on the network edge of 5G networks, in order to provide more responsive services to network subscribers. Such applications may include VNFs and/or CNFs that intercommunicate within a network slice or between different network slices. Such inter-function communications may be targeted by bad actors to disrupt the applications, the network servers on which they operate, or the network itself. Rather than rely on application developers to implement security measures to prevent such disruptions, in embodiments of the disclosure the network provider manages the security of virtual network slice resources for such edge applications.

Providing security within a 5G network is a technical problem that is partially solved by the encryption, anti-tracking, anti-spoofing, and other features provided by the Network Security Function (NSF) and other existing 5G security functions. However, in some circumstances bad actors are still able to corrupt an NF after it has gone through network authentication and thereby gain unauthorized access to other NFs within the same slice, another instantiation of the NF in another slice, or other NFs in other slices. An SSZ according to the disclosure provides a technical solution to this technical problem by requiring slices and NFs to preregister their security profiles and communication parameters, then detecting when NF communications diverge from those registered profiles and parameters.

SSZs according to the disclosure allow network providers to provide security features to application developers that exceed the features provided by the NSF and other existing 5G security functions. Using the SSZ, the network provider is able to register a security profile for the SSZ and security profiles for the slices that will be operating within the SSZ. An application developer is able to register security profiles for its NFs that will be operating within the SSZ and register parameters for expected communications between its NFs and other NFs. The SSZ is thus able to notify a network system administrator when registered security profiles and communication parameters are not complied with. In some embodiments, the SSZ itself blocks such noncompliant registrations. Furthermore, the application developer is also able to create NFs that notify the SSZ of individual communications between NFs and the SSZ is able to notify the network system administrator or to block communications that do not comply with all of the registrations and security profiles of the SSZ.

By implementing SSZs according to the disclosure, the network provider establishes a zone with a defined security profile in which NFs communicating within a single slice or across multiple slices may securely operate. A slice requests to register its security profile with the SSZ and the SSZ determines whether the slice security profile is compliant with the SSZ security profile, then either registers or denies registration to the slice. The SSZ also notifies a network system administrator of attempts to register non-compliant slices. An NF requests to register its security profile with the SSZ and the SSZ determines whether the NF security profile is compliant with the SSZ security profile, then registers or denies registration to the NF. The SSZ also notifies a network system administrator of attempts to register non-compliant NFs.

SSZ-compliant NFs also register parameters of intended communications with other functions that are also registered with the SSZ. The NF requests to register parameters of the communications with the SSZ and the SSZ determines (i) whether the communicating NFs and their slice(s) are registered with the SSZ and (ii) whether the parameters of the communications are compliant with the security profiles of SSZ and the slice(s). If both the registration and security criteria are met, the SSZ registers or denies registration for the communications. The SSZ also notifies a network system administrator of attempts to register non-compliant communications.

Furthermore, SSZ-compliant NFs notify the SSZ of individual communications (or messages) with other NFs. The NF notifies the SSZ of parameters of a communication the NF is sending to another NF and the SSZ determines whether a matching communication between the two NFs has been registered with the SSZ and (ii) whether the parameters of this communication are compliant with the parameters of the matching registered communication. If the criteria are both met, the SSZ notifies the NF. If either criterion is not met, the SSZ also notifies a network system administrator of an SSZ communication violation.

Security profiles and communication parameters that are registered with the SSZ are stored in secure storage function such as a distributed ledger, a hyperledger, a blockchain or other storage medium that provides security benefits such as decentralized storage, detection of altered records, and traceability. Additionally, the secure storage function utilizes secure communication channels to provide security for the SSZ as it stores or retrieves information to/from the secure storage function.

In embodiments of the disclosure, a system of network SSZs are provided. An SSZ according to the disclosure is defined as a logical area of infrastructure and services with a specific security profile where a certain level of security and trust is required before communication is granted between slices/elements. As a VNF or CNF in the SSZ initiates communication with another VNF or CNF in the same slice or a different slice, the function registers the communication with an SSZ function, providing parameters to an SSZ function that characterize the communication. An SSZ function according to the disclosure is a virtual network function that manages and/or administers the features of an SSZ. As subsequent communications occur or are registered, the SSZ function compares new parameters to previously registered parameters in order to detect parameter changes that may indicate communication changes that could disrupt performance of subscriber applications, network servers, or the network itself. Secure storage of the registered parameters and authentication of the identity of the VNF or CNF making the registration may be provided in the SSZ function in some embodiments by a hyperledger that collects the registered parameter data.

Turning now to FIG. 1A, a communication system 100 according to the disclosure is described. In an embodiment, the system 100 comprises User Equipment (UE) 102 and 104, and servers 130, 132, 134, 136, and 138 (also referred to as network servers), communicating wired or wirelessly via a network 120. The UE 102 may be a handheld device, such as a smart phone or tablet and the UE 104 may be a laptop computer, both communicating wirelessly with the network 120. The network 120 may be one or more public networks, one or more private networks, or a combination thereof. The network 120 may comprise or be coupled to a 5G core network 122 or, in other embodiments, a 4G or 4G LTE network.

The UE 102 comprises a processor 110, a memory 112, a subscriber identification (or identity) module (SIM) 114, a cellular radio transceiver 116, and an antenna 118. In other embodiments, the SIM 114 may be an embedded SIM (eSIM) or a software SIM. A portion of the memory 112 may be a non-transitory memory and a portion of the memory 112 may be a transitory memory. When properly activated and provisioned, the UE 102 may be able to establish a wireless communication link to a radio access network (RAN), for example to an access node 124. The access node 124 may also be referred to as a cell site or cell tower in some contexts. The access node 124 may provide the UE 102 a communication link to the network 120. The UE 102 may communicate via the access node 124 and via the network 120 to the servers 130, 132, and 134.

The network 120 may include elements from more than one wired or wireless service provider. For example, the UE 102 may be coupled to the network 120 via a first service provider, while the application server 108 may be coupled via a second service provider. Any of the elements of system 100 may be coupled to other elements via the 5G core network 122. Where the network 120 comprises elements from multiple service providers, the network 120 may include a plurality of 5G core networks 122, each supported by a different service provider and coupled to each other directly or via wired or wireless connections through non-5G elements of the network 120.

The UE 102 may be coupled wirelessly to the network 120. Based on proximity, radio channel quality, or other conditions, the UE 102 may be wirelessly coupled to the network 120 via one or the other of the access nodes 124 and 126. When the UE 102 is coupled to the network 120 via the access node 124 and conditions change, the network 120 may transfer (or hand off) an active call or data session of the UE 102 from the access node 124 to the access node 126.

The non-transitory memory 112 of the UE 102 includes an instantiation of a VNF 140a. Similarly, the UE 104 includes an instantiation of a VNF 140 and a CNF 148. The server 130 includes an instantiation of a CNF 144 and a second instantiation VNF 140b of the VNF 140a executing in the UE 102. The server 132 includes a slice security zone (SSZ) function 146. The server 134 includes a 5G network slice management function (NSMF) 150. The server 136 includes a system administration function 152. The server 138 includes a secure storage function 154. The SSZ function 146, the NSMF 150, the system administration function 152, and the secure storage function 154 are described in greater detail below.

As described above, 5G networks implement 'slices,' which serve to multiplex independent virtual networks (slices) on a common physical network infrastructure. Each slice may be thought of as an isolated end-to-end network customized to the requirements of a network subscriber or subscriber application. The NSMF 150 implements and administers a slice. The system administration function 152 provides input/output and reporting functions for an operator of the 5G core network 122. The secure storage function 154 is available to network elements of the 5G core network 122 and, in some embodiments, is implemented using a hyperledger. As used herein, secure storage means storage media that provide benefits such as decentralized storage, detection of altered records, and traceability. Furthermore, secure storage communicates with other network elements via secure communication channels.

The SSZ function 146 implements an SSZ according to the disclosure, which provides additional security protection of the network elements (and functions) that are part of the slice. The SSZ function 146 provides a base level SSZ security profile for the zone. The SSZ function 146 further confirms that slices registering with the SSZ function 146 implement slice security profiles that are compliant with the SSZ security profile. The SSZ function 146 also confirms that any NFs that registers with the SSZ function 146 implement NF security profiles that are compliant with the SSZ security profile. In some embodiments, an NF security profile may include any or all of the following:

A slice domain: the physical network resources (e.g., storage and computation, connectivity, and radio) on which a slice is multiplexed.

A slice/service type: defines an expected behavior of a slice as regards specific features and services. Examples of slice service type include enhanced Mobile Broadband (eMBB), Ultra Reliable Low Latency Communications (URLLC), and Massive Internet of Things (MIoT).

a 5G interface type or protocol of a slice in which the NF is executing, e.g., for a User Plane Function (UPF), the N3, N9, or N6 interface, or for a Session Management Function (SMF), the N4 or N11 interface.

Examples of elements that may be included in an individual SSZ security profile are:

Radio Access Technology (RAT) types that are allowed to communicate within the SSZ.

Internet Protocol (IP) address objects that are allowed to communicate within the SSZ, e.g., gNodeB (gNB), Access and Mobility Management Function (AMF), Session Management Function (SMF), and User Plane Function (UPF).

Packet inspection to ensure that only specified types of packets in the SSZ (e.g., only HTTP revision 2.0 (HTTP/2) control packets).

A network segment (e.g., a subnet) for slices and functions of the SSZ.

Network Slice IDs that are permitted to register (or are blocked from registering) in the SSZ.

Other features to be implemented by the SSZ, such as an Intrusion Detection System (IDS), Intrusion Prevention System (IPS), anti-malware detection, and threat detection based on intelligence information.

Examples of elements that may be included in a slice security profile are:
- Information about the slice required to determine compliance with the SSZ security protocol: e.g., RAT types, IP address objects used in the slice.
- One or more SSZ IDs that the slice is expecting to register with.
- The Network Slice ID (NSSAI) of the slice.

In various embodiments, the NF security profile may additionally include parameters of communications from the NF being registered, such as a throughput, a latency, an availability, a reliability, a jitter, or a maximum expected bandwidth specification.

The SSZ function 146 further determines whether only the network elements of the slices and NFs registered with the SSZ are communicating within the SSZ. The SSZ also determines whether elements of different security levels that belong to another network slice are authorized to communicate with other elements in another network slice that may have a different security level, according to the SSZ security profile and the slice and NF security profile for slices and NFs registered with the SSZ.

Figure 1B:
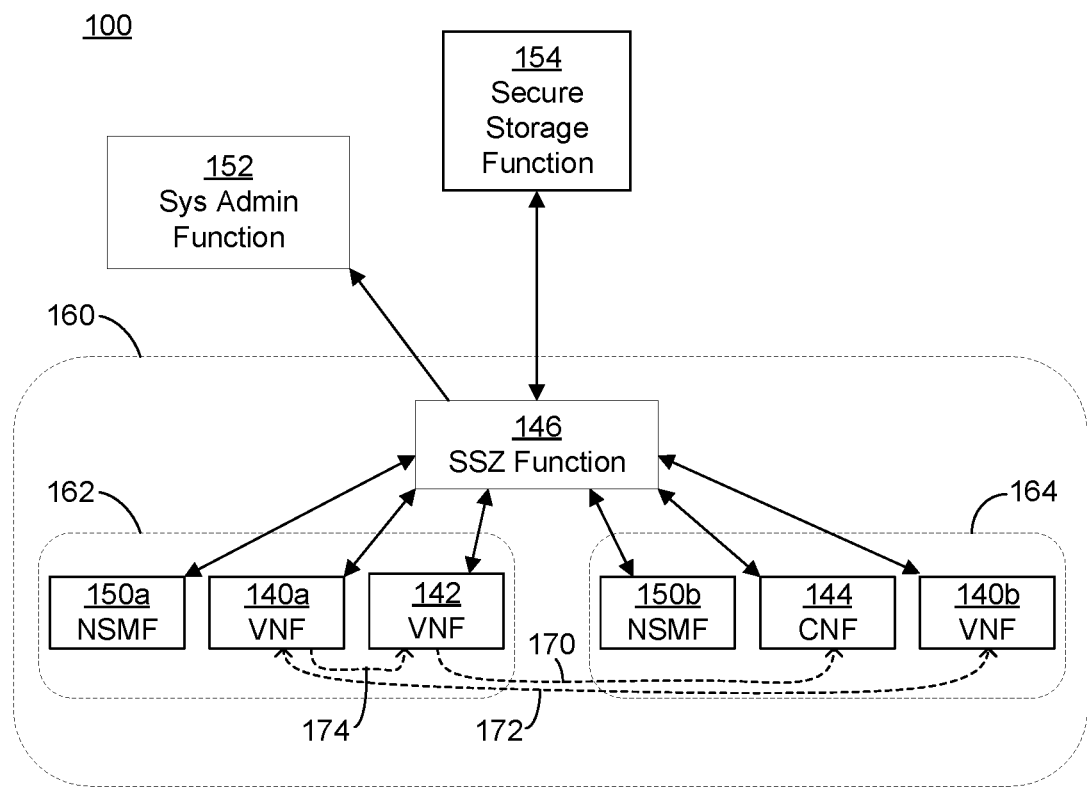
FIG. 1B is a block diagram of elements of the communication system of FIG. 1A according to an embodiment of the disclosure.

FIG. 1B is a block diagram of elements of the communication system 100 of FIG. 1A according to an embodiment of the disclosure. An SSZ 160 is administered by the SSZ function 146. Slices 162 and 164, managed respectively by NSMFs 150a and 150b, are registered in the SSZ 160. A first VNF is instantiated in both the slice 162 (as the VNF 140a) and the slice 164 (as the VNF 140b). The VNF 142 is instantiated only in the slice 162 and the CNF 144 is instantiated only in the slice 164.

When configured by an operator of the 5G network 122, the SSZ function 146 stores in the secure storage function 154 an SSZ security profile of the SSZ 160. When the NSMF 150 determines that the slice 162 is to be a part of the SSZ 160, the NSMF 150 registers the slice 162 by sending a slice registration request to the SSZ function 146. If the SSZ function 146 determines that a slice security profile in the slice registration request is compliant with the SSZ security profile, the SSZ function 146 stores in the secure storage function 154 a slice registration association between the slice 162 and the SSZ 160. The SSZ function 146 further sends a slice registration response to the NSMF 150 with information related to (or indicating) whether the slice 162 was registered in the SSZ 160. In a similar series of actions, the NSMF 150b registers the slice 164 in the SSZ 160.

When the VNF 142 is instantiated in the slice 162, it sends an NF registration request to the SSZ function 146. If the SSZ function 146 determines that an NF security profile in the NF registration request is compliant with SSZ security profile, the SSZ function 146 stores in the secure storage function 154 an NF registration association between the VNF 142 and the SSZ 160. The SSZ function 146 further sends an NF registration response to the VNF 142 with information related to whether the VNF 142 was registered in the SSZ 160. In a similar series of actions, the VNFs 140a and 140b and the CNF 144 registers themselves in the SSZ 160.

When the VNF 142 determines that it will be sending communications 170 to the CNF 144, the VNF 142 sends an SSZ communication registration request to the SSZ function 146. The SSZ function 146 first determines whether the slice 162, the slice 164, the VNF 142, and the CNF 144 are all registered in the SSZ 160. If not, the SSZ function 146 sends a registration violation message to the system administration function 152 as a notification that an unregistered function has attempted to register communications 170.

If the functions and slices are all registered, the SSZ function 146 determines whether a registration communication parameter included in the SSZ communication registration request complies with the SSZ 160 security profile and the slice security profiles of the slices 162 and 164. The SSZ function 146 may also determine whether the registration communication parameter complies with the NF security profiles of the VNF 142 and the CNF 144. If the registration communication parameter fails any applicable security profile tests, the SSZ function 146 sends a registration violation message to the system administration function 152 as a notification that a function has attempted to register communications 170 that violate one or more security profiles.

In some embodiments, the registration communication parameter may include a slice domain, a slice/service type, or a 5G interface type of a slice in which the NF is executing. In various embodiments, the registration communication parameter may additionally include parameters of the communication being registered, such as a throughput, a latency, an availability, a reliability, a jitter, or a desired bandwidth specification.

If the SSZ communication registration request passes all registration and security profile tests, the SSZ function 146 stores in the secure storage function 154 a communication registration association relating to the SSZ communication registration request and sends an SSZ communication registration response to the VNF 142. The SSZ communication registration response may include information relating to whether the requested communication has been registered. In a similar way, the instantiation VNF 140a may register with the SSZ function 146 that it will be communicating 172 with the instantiation VNF 140b. Similarly, the VNF 140a may register with the SSZ function 146 that it will be communicating 174 with the VNF 142 within the same slice 162.

When the VNF 142 determines that it will send a message to the CNF 144, it sends an SSZ communication notification request to the SSZ function 146. The SSZ communication notification request includes an inter-function communication parameter that describes characteristics of the message to be sent. In some embodiments, the inter-function communication parameter may include a slice domain, a slice/service type, or a 5G interface type of a slice in which the NF is executing. In various embodiments, the inter-function communication parameter may additionally include parameters of the communication of which the SSZ function 146 is being notified, such as a throughput, a latency, an availability, a reliability, a jitter, or a bandwidth specification.

Upon receipt of the SSZ communication notification request, the SSZ function 146 first determines whether the secure storage function 154 includes a matching communication registration association that includes the first and second IDs of the VNF 142 and the CNF 144 and a registration communication parameter with which the inter-function communication parameter is compliant. If not, the SSZ function 146 sends a registration communication violation message to the system administration function 152 as a notification that a network element is attempting an unregistered communication. If the SSZ communication notification request passes the registration test, the SSZ function 146 sends an SSZ communication authorization response to the VNF 142. The SSZ communication authorization response may include information relating to whether the requested communication has been authorized.

While the servers 130, 132, 134, 136, and 138 are shown in FIG. 1 as single network elements, it will be understood that any or all of their functions may be implemented by computer systems and may be performed by a cluster of network-connected devices or provided in a decentralized manner by a network of geographically separated network elements.

Figure 2:
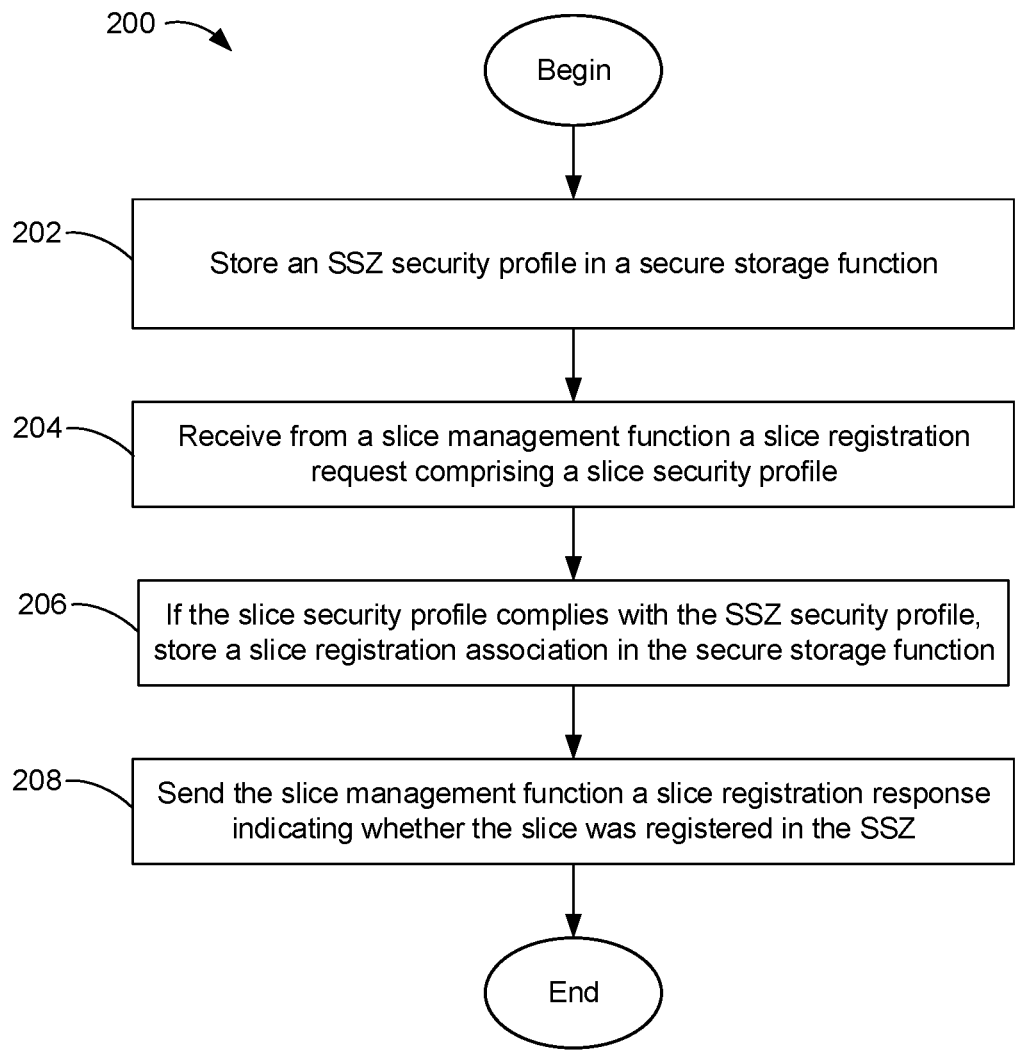
FIG. 2 is a flow chart of a method according to an embodiment of the disclosure.

FIG. 2 is a flow chart of a method 200 according to an embodiment of the disclosure. In an embodiment, the method 200 is a method for implementing an SSZ in a 5G network. At step 202, the SSZ function 146 stores an SSZ security profile of the SSZ 160 in the secure storage function 154. The SSZ security profile may include information as discussed above. At step 204, the SSZ function 146 receives from the NSMF 150a a slice registration request that includes information relating to a slice security profile of the slice 162.

At step 206, the SSZ function 146 determines whether the slice security profile complies with the SSZ security profile and, if it does, stores a slice registration association between the slice 162 and the SSZ 160 in the secure storage function 154. At step 208, the SSZ function 146 sends the NSMF 150a a slice registration response that includes information relating to (or indicating) whether the slice 162 was registered in the SSZ 160. Steps 204, 206, and 208 may also be performed in response to a slice registration request received from the NSMF 150b.

In some embodiments, the SSZ function 146 further receives from the VNF 142 an NF registration request that includes information relating to an NF security profile of the VNF 142. The NF security profile may include one or more of a slice ID, a slice domain, a slice/service type, or a 5G interface type of the slice 162 in which the VNF 142 is executing. In some such embodiments, an NF registration request may be received from the CNF 144.

In other such embodiments, the SSZ function 146 further receives from the VNF 142 an SSZ communication registration request that includes an identifier of the CNF 144 and a registration communication parameter. The SSZ function 146 determines whether both the VNF 142 and the CNF 144 are registered in the SSZ 160 and whether the registration communication parameter complies with the SSZ security profile and the slice security profiles for the slices 162 and 164. If so, the SSZ function 146 sends to the VNF 142 an SSZ communication authorization response.

The registration communication parameter may include one or more of a slice domain, a slice/service type, or a 5G interface type of the slice 162 and/or the slice 164 in which the CNF 144 is executing. The registration communication parameter may additionally or alternatively include one or more parameters of the communication being registered, such as a throughput, a latency, an availability, a reliability, a jitter, or a bandwidth specification for the communication between the VNF 142 and the CNF 144.

Figure 3:
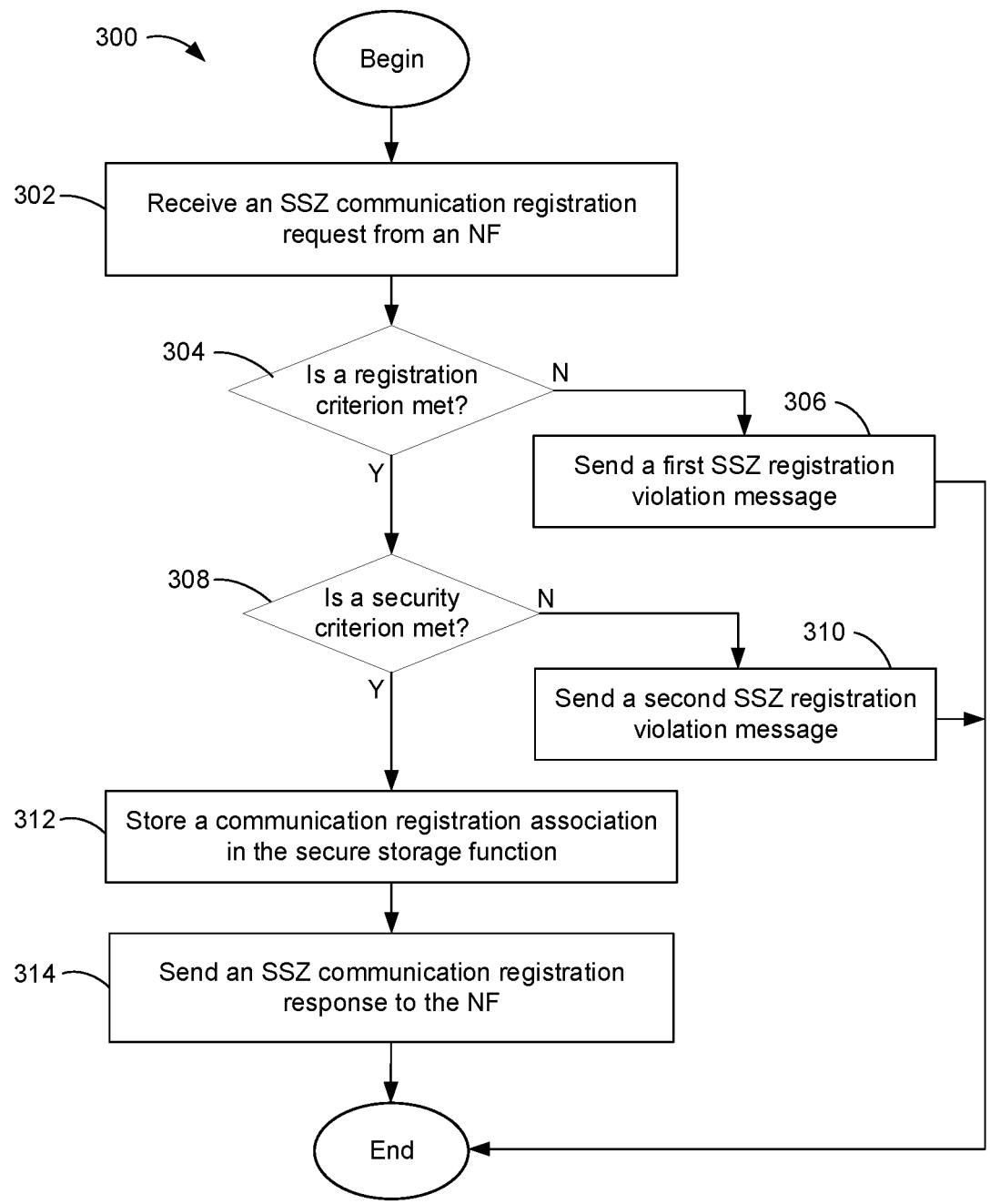
FIG. 3 is a flow chart of a method according to an embodiment of the disclosure.

FIG. 3 is a flow chart of a method 300 according to an embodiment of the disclosure. In an embodiment, the method 300 is a method for administering an SSZ in a 5G network. At step 302, the SSZ function 146 receives an SSZ communication registration request from the VNF 142. The SSZ communication registration request includes an identifier (ID) of the VNF 142, an ID of the slice 162, an ID of the CNF 144, an ID of the slice 164, and a registration communication parameter (as described with reference to FIG. 2).

In step 304, the SSZ function 146 determines whether a registration criterion is met. The registration criterion is met when the secure storage function 154 includes a slice registration association between the slice 162 and the SSZ 160, a slice registration association between the slice 164 and the SSZ 160, an NF registration association between the VNF 142 and the SSZ 160, and an NF registration association between the CNF 144 and the SSZ 160.

If the registration criterion is not met, at step 306 the SSZ function 146 sends to the system administration function 152 a first SSZ registration violation message that includes information relating to the communication registration request and the SSZ function 146. The first SSZ registration violation message may include the ID of the VNF 142, the ID of the slice 162, the ID of the CNF 144, the ID of the slice 164, and an ID of the SSZ 160. The first SSZ registration violation message may further include information relating to which of the slice 162, the slice 164, the VNF 142, and the CNF 144 are not registered in the SSZ 160.

If the registration criterion is met, at step 308 the SSZ function 146 determines whether a security criterion is met. The security criterion is met when the registration communication parameter complies with all stored security profiles related to the SSZ: e.g., the SSZ security profile of the SSZ 160, the slice security profile of the slice 162, and the slice security profile of the slice 164, as stored in the secure storage function 154.

If the security criterion is not met, at step 310 the SSZ function 146 sends to the system administration function 152 a second SSZ registration violation message. The second SSZ registration violation message may include the ID of the VNF 142, the ID of the slice 162, the ID of the CNF 144, the ID of the slice 164, and an ID of the SSZ 160. The second SSZ registration violation message may further include information relating to which security profile(s) of the slice 162, the slice 164, and the SSZ 160 are not complied with by the registration communication parameter.

If the security criterion is met, at step 312 the SSZ function 146 stores in the secure storage function 154 a communication registration association that includes the ID of the VNF 142, the ID of the slice 162, the ID of the CNF 144, the ID of the slice 164, and the registration communication parameter. In step 314, the SSZ function 146 sends an SSZ communication registration response to the VNF 142.

Figure 4:
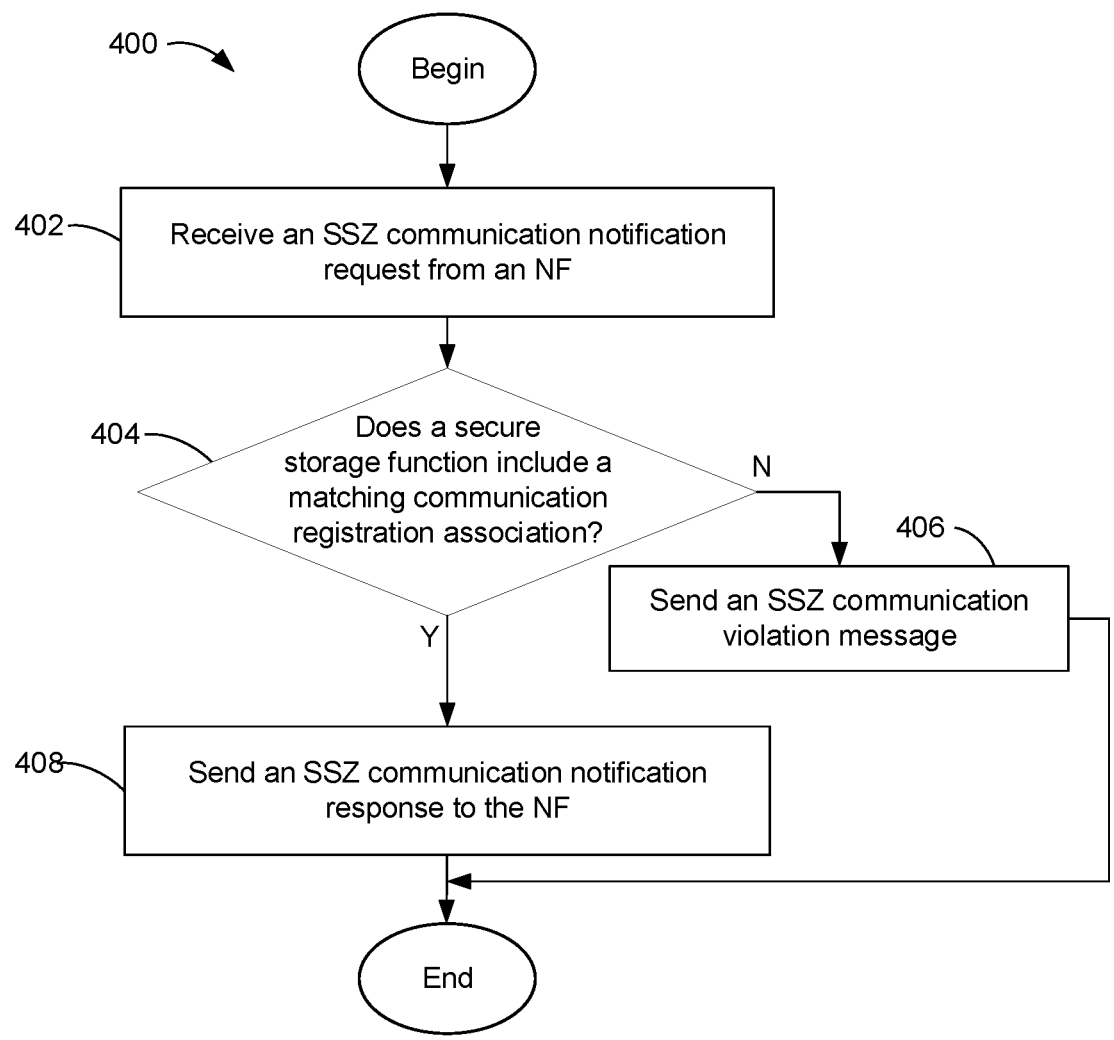
FIG. 4 is a flow chart of a method according to an embodiment of the disclosure.

FIG. 4 is a flow chart of a method 400 according to an embodiment of the disclosure. In an embodiment, the method 400 is a method for enforcing a slice security zone (SSZ) in a 5G network. At step 402, the SSZ function 146 receives an SSZ communication notification request from the VNF 142. The SSZ communication notification request includes an ID of the VNF 142, an ID of the CNF 144, and an inter-function communication parameter. The inter-function communication parameter includes one or more parameters of the communication between the VNF 142 and the CNF 144 of which the VNF 142 is notifying the SSZ function 146, such as a slice domain, a slice/service type, a 5G interface type of the slice 162 in which the VNF 142 is executing, a throughput, a latency, an availability, a reliability, a jitter, or a bandwidth specification.

At step 404, the SSZ function 146 determines whether the secure storage function 154 includes a matching communication registration association that includes the IDs of the VNF 142 and the CNF 144 and a registration communication parameter with which the inter-function communication parameter is compliant. If the secure storage function 154 does not include a matching communication registration association, in step 406 the SSZ function 146 sends an SSZ communication violation message to the system administration function 152. In step 406, the SSZ function 146 may also send an SSZ communication denial request to the VNF 142. The SSZ communication violation message includes the IDs of the VNF 142 and the CNF 144 and information relating to whether the secure storage function 154 does not include a matching communication registration association comprising the first and second NF IDs or includes a matching communication registration association, but the inter-function communication parameter is not compliant with the registration communication parameter of the matching communication registration association.

If the secure storage function 154 does include a matching communication registration association, in step 408 the SSZ function 146 sends an SSZ communication notification response to the VNF 142.

Figure 5:
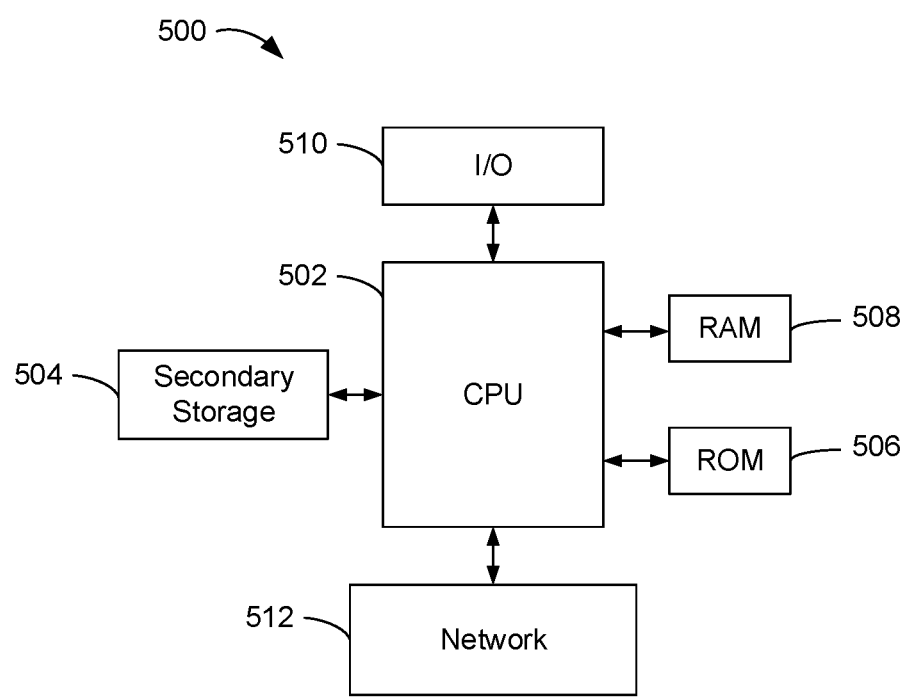
FIG. 5 illustrates a computer system suitable for implementing one or more embodiments disclosed herein.

FIG. 5 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID), The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 6:
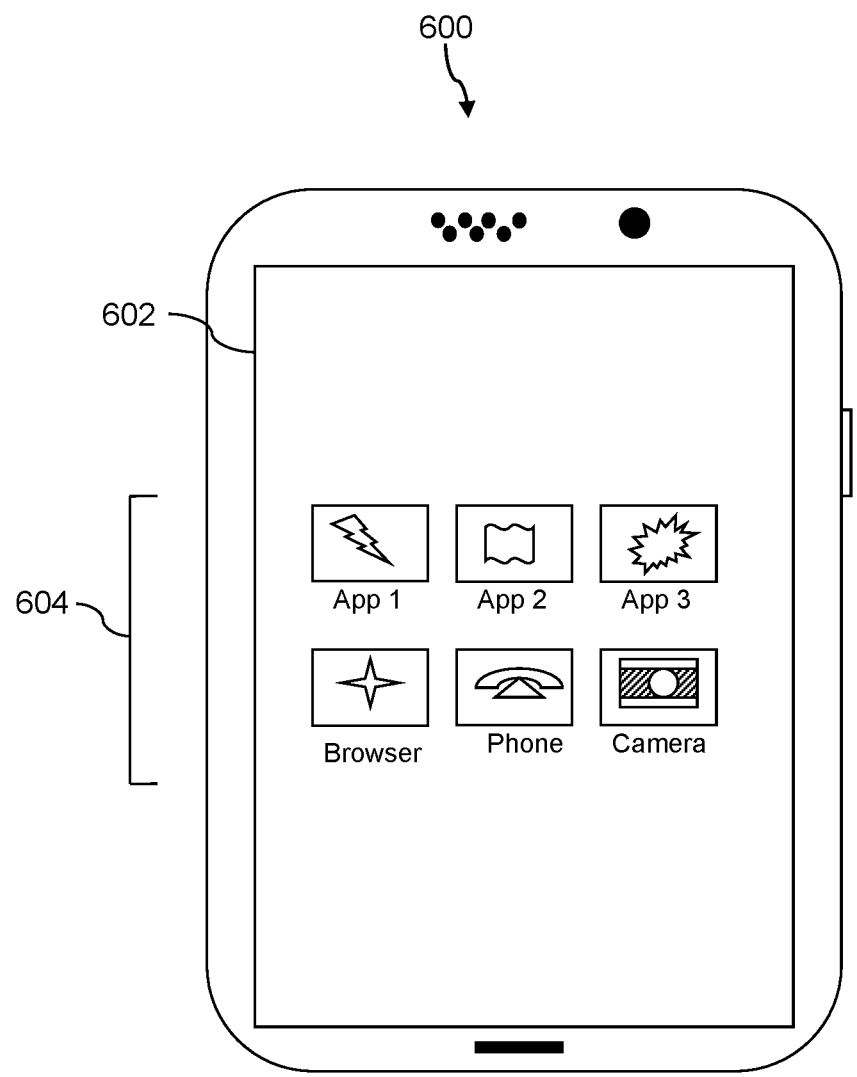
FIG. 6 is an illustration of a wireless communication device according to an embodiment of the disclosure.

FIG. 6 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 7:
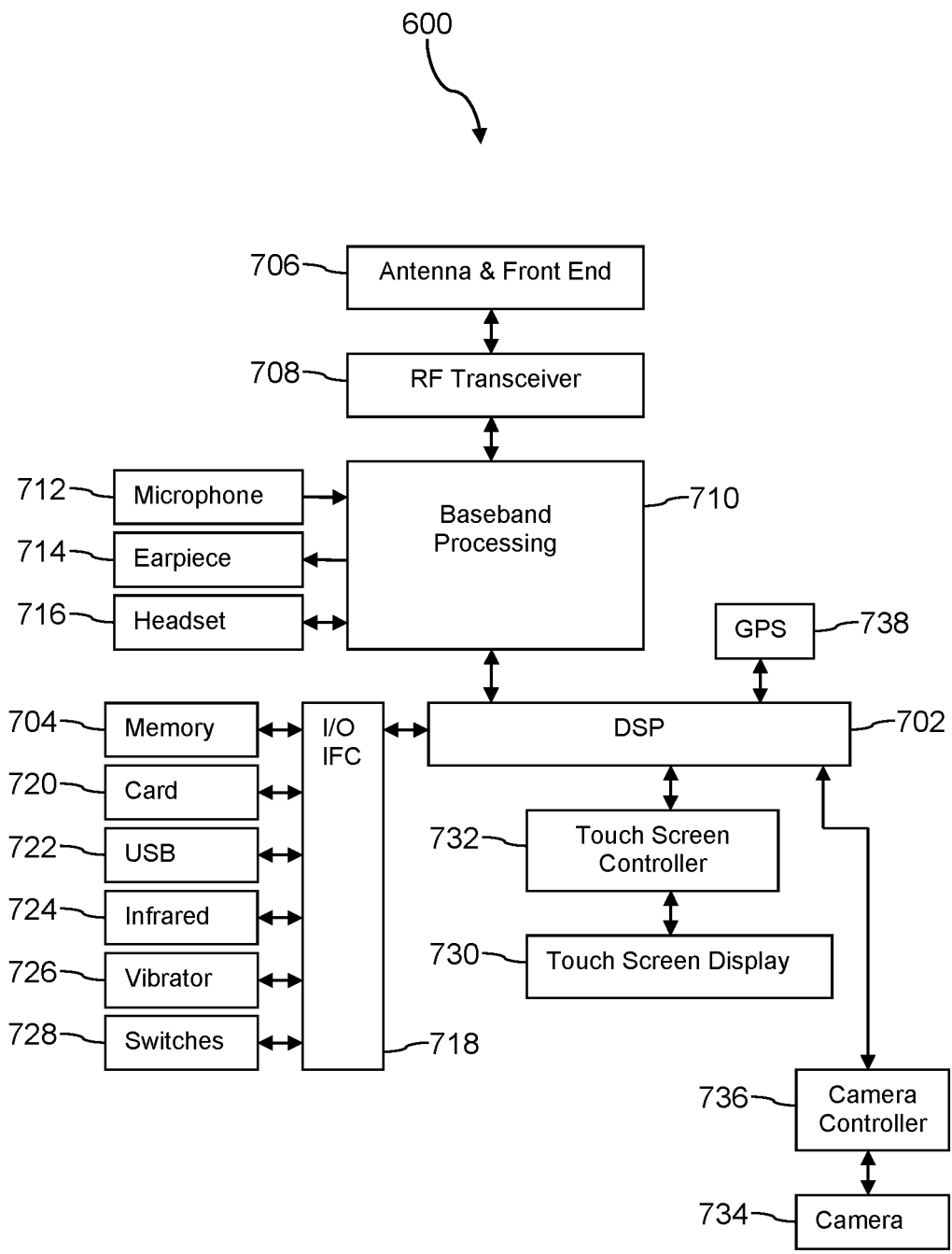
FIG. 7 is a block diagram or a hardware architecture of a wireless communication device according to an embodiment of the disclosure.

FIG. 7 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include one or more antenna and front end unit 706, a one or more radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen display 730, a touch screen controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 708 may comprise a near field communication (NFC) transceiver. The NFC transceiver may be used to complete payment transactions with point-of-sale terminals or other communications exchanges. In an embodiment, each of the different radio transceivers 708 may be coupled to its own separate antenna. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 8A:
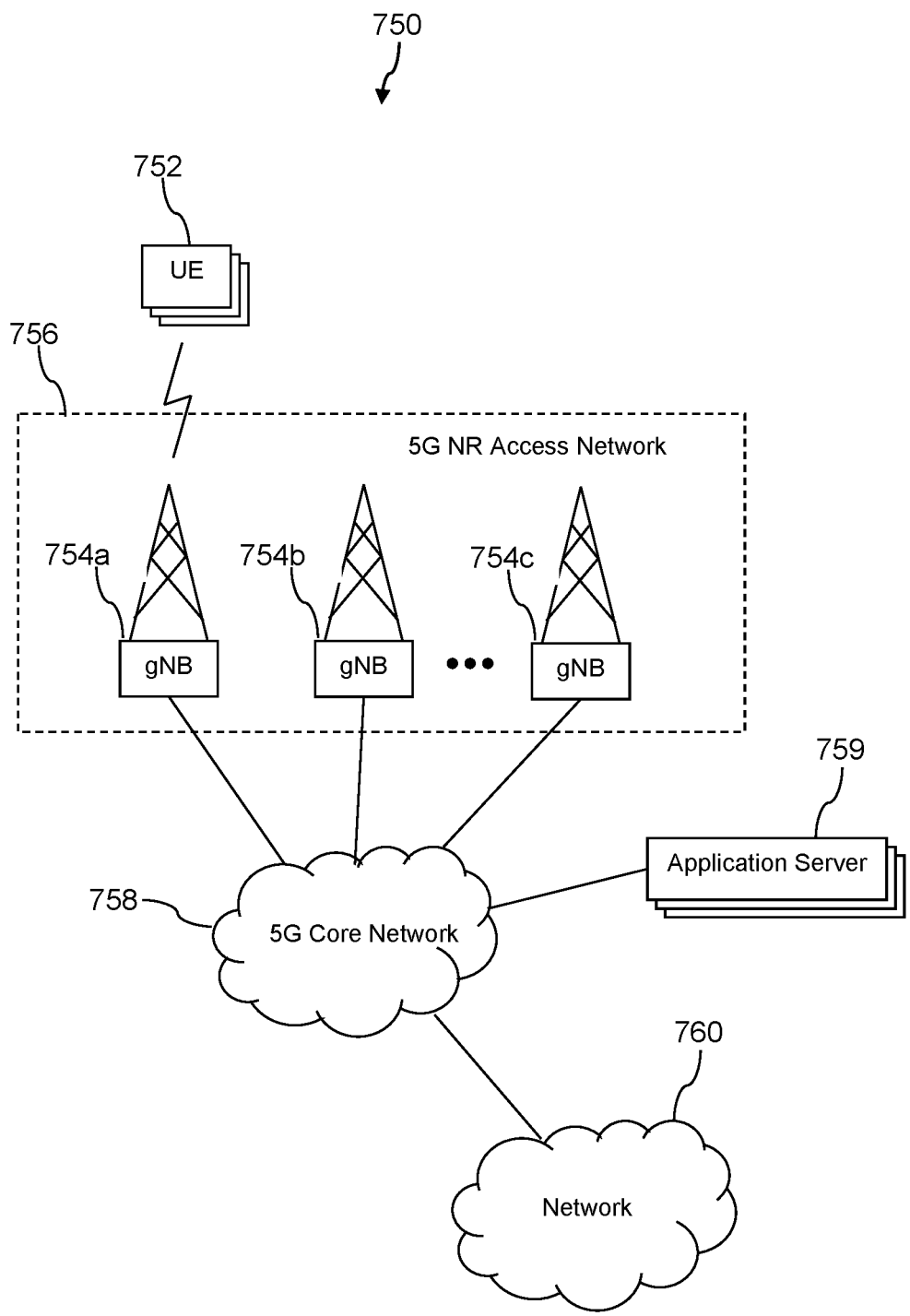
FIG. 8A is a block diagram of another communication system according to an embodiment of the disclosure.

Turning now to FIG. 8A, an exemplary communication system 750 is described. Typically, the communication system 750 includes a number of access nodes 754 that are configured to provide coverage in which UEs 752 such as cell phones, tablet computers, machine-type-communication devices, tracking devices, embedded wireless modules, and/or other wirelessly equipped communication devices (whether or not user operated), can operate. The access nodes 754 may be said to establish an access network 756. The access network 756 may be referred to as a radio access network (RAN) in some contexts. In a 5G technology generation an access node 754 may be referred to as a next Generation Node B (gNB). In 4G technology (e.g., long term evolution (LTE) technology) an access node 754 may be referred to as an evolved Node B (eNB). In 3G technology (e.g., code division multiple access (CDMA) and global system for mobile communication (GSM)) an access node 754 may be referred to as a base transceiver station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations.

In an embodiment, the access network 756 comprises a first access node 754a, a second access node 754b, and a third access node 754c. It is understood that the access network 756 may include any number of access nodes 754. Further, each access node 754 could be coupled with a core network 758 that provides connectivity with various application servers 759 and/or a network 760. In an embodiment, at least some of the application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 could engage in air-interface communication with an access node 754 and could thereby communicate via the access node 754 with various application servers and other entities.

The communication system 750 could operate in accordance with a particular radio access technology (RAT), with communications from an access node 754 to UEs 752 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 754 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 could define an air interface configured in a specific manner to define physical resources for carrying information wirelessly between the access node 754 and UEs 752.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 752.

In addition, certain resource elements on the example air interface could be reserved for special purposes. For instance, on the downlink, certain resource elements could be reserved to carry synchronization signals that UEs 752 could detect as an indication of the presence of coverage and to establish frame timing, other resource elements could be reserved to carry a reference signal that UEs 752 could measure in order to determine coverage strength, and still other resource elements could be reserved to carry other control signaling such as PRB-scheduling directives and acknowledgement messaging from the access node 754 to served UEs 752. And on the uplink, certain resource elements could be reserved to carry random access signaling from UEs 752 to the access node 754, and other resource elements could be reserved to carry other control signaling such as PRB-scheduling requests and acknowledgement signaling from UEs 752 to the access node 754.

The access node 754, in some instances, may be split functionally into a radio unit (RU), a distributed unit (DU), and a central unit (CU) where each of the RU, DU, and CU have distinctive roles to play in the access network 756. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 8B:
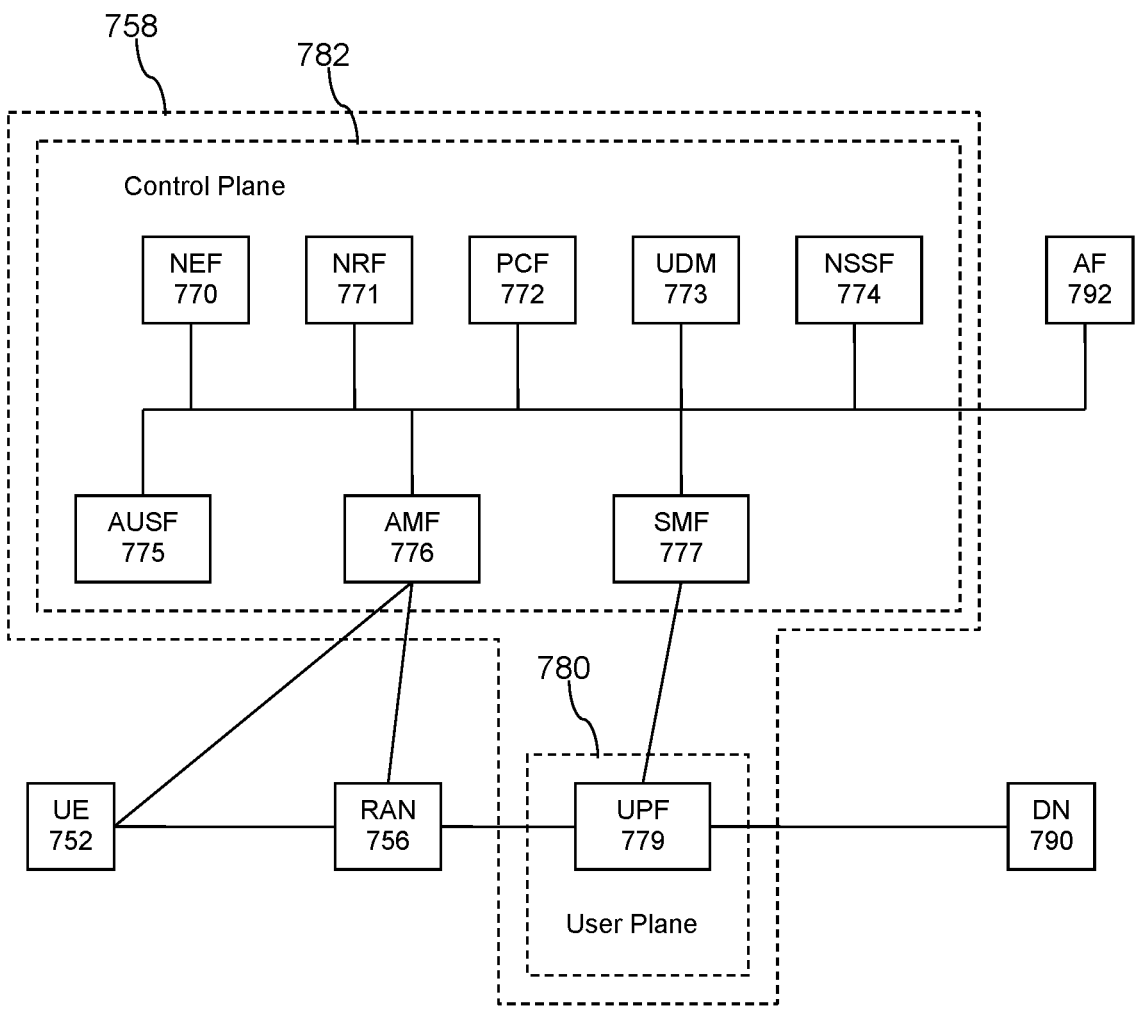
FIG. 8B is a block diagram of a core network of the communication system of FIG. 8A according to an embodiment of the disclosure.

Turning now to FIG. 8B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment.

The UPF 779 delivers packet processing and links the UE 752, via the access network 756, to a data network 790 (e.g., the network 560 illustrated in FIG. 8A). The AMF 776 handles registration and connection management of non-access stratum (NAS) signaling with the UE 752. Said in other words, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be execute on an application server 779 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

Figure 9A:
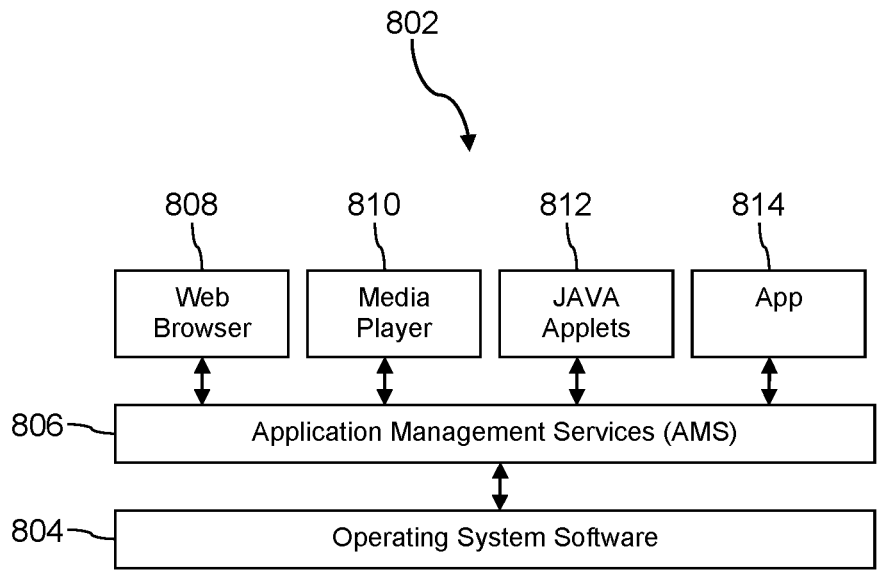
FIG. 9A is a block diagram of a software architecture of a wireless communication device according to an embodiment of the disclosure.

FIG. 9A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 400. Also shown in FIG. 9A are a web browser application 808, a media player application 810, and JAVA applets 812. The web browser application 808 may be executed by the UE 400 to browse content and/or the Internet, for example when the UE 400 is coupled to a network via a wireless link. The web browser application 808 may permit a user to enter information into forms and select links to retrieve and view web pages. The media player application 810 may be executed by the UE 400 to play audio or audiovisual media. The JAVA applets 812 may be executed by the UE 400 to provide a variety of functionality including games, utilities, and other functionality.

Figure 9B:
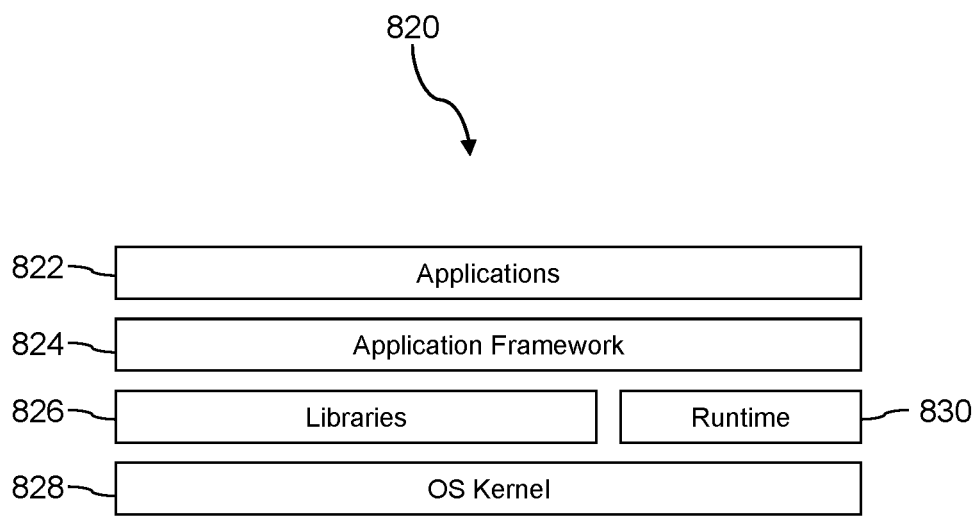
FIG. 9B is a block diagram of another software architecture of a wireless communication device according to an embodiment of the disclosure.

FIG. 9B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for administering a slice security zone (SSZ) in a 5G network, the method comprising:
   receiving at an SSZ function executing on a first network server an SSZ communication registration request, the SSZ communication registration request received from a first network function (NF), the SSZ communication registration request comprising an identifier (ID) of the first NF, a first slice ID, a second NF ID, a second slice ID, and a registration communication parameter;
   determining by the SSZ function whether a registration criterion is met by determining whether a secure storage function includes a first slice registration association between the first slice and the SSZ, a second slice registration association between the second slice and the SSZ, a first NF registration association between the first NF and the SSZ, and a second NF registration association between the second NF and the SSZ;
   if the registration criterion is not met, sending by the SSZ function a first SSZ registration violation message to a system administration function executing on a second network server, the first SSZ registration violation message including information relating to the SSZ communication registration request and the SSZ function;
   if the registration criterion is met, determining by the SSZ function whether a security criterion is met by determining whether the registration communication parameter complies with an SSZ security profile of the SSZ, a first slice security profile of the first slice, and a second slice security profile of the second slice that are stored in the secure storage function;
   if the security criterion is not met, sending by the SSZ function a second SSZ registration violation message to the system administration function; and
   if the security criterion is met:
      storing in the secure storage function a communication registration association comprising the first NF ID, the first slice ID, the second NF ID, the second slice ID, and the registration communication parameter; and
      sending by the SSZ function an SSZ communication registration response to the first NF.

2. The method of claim 1, wherein:
the first SSZ registration violation message comprises (i) identifiers of the first NF, the first slice, the second NF, the second slice, and the SSZ, and (ii) information relating to which of the first slice, the second slice, the first NF, and the second NF are not registered in the SSZ; and
the second SSZ registration violation message comprises (i) identifiers of the first NF, the first slice, the second NF, the second slice, and the SSZ, and (ii) information relating to which security profile(s) of the first slice, the second slice, and the SSZ are not complied with by the registration communication parameter.

3. The method of claim 1, wherein determining whether the security criterion is met further includes determining whether the registration communication parameter complies with a security profile of the first NF stored in the secure storage function and a security profile of the second NF stored in the secure storage function.

4. The method of claim 1, wherein the second slice ID the same as the first slice ID.

5. The method of claim 1, wherein the registration communication parameter includes one or more of a slice domain, a slice/service type, or a 5G interface type of a slice in which the NF is executing.

6. The method of claim 1, wherein the registration communication parameter includes a throughput, a latency, an availability, a reliability, a jitter, or a bandwidth for registered communication between the first NF and the second NF.

7. The method of claim 1, wherein the secure storage function is a hyperledger.

8. A method for enforcing a slice security zone (SSZ) in a 5G network, the method comprising:
receiving at an SSZ function executing on a first network server an SSZ communication notification request, the SSZ communication notification request received from a first network function (NF), the SSZ communication notification request comprising a first NF identifier (ID) of the first NF, a second NF ID, and an inter-function communication parameter;
determining by the SSZ function whether a secure storage function includes a matching communication registration association comprising the first and second NF IDs and a registration communication parameter with which the inter-function communication parameter is compliant;
if the secure storage function does not include the matching communication registration association, sending by the SSZ function an SSZ communication violation message to a system administration function; and
if the secure storage function includes the matching communication registration association, sending by the SSZ function an SSZ communication notification response to the first NF.

9. The method of claim 8, further comprising:
if the secure storage function does not include the matching communication registration association, sending by the SSZ function an SSZ communication denial request to the first NF.

10. The method of claim 8, wherein the SSZ communication violation message comprises the first NF ID, the second NF ID, and information relating to whether the secure storage function does not include (i) the matching communication registration association comprising the first and second NF IDs or (ii) the registration communication parameter with which the inter-function communication parameter is compliant.

11. The method of claim 8, wherein the SSZ communication violation message comprises the first NF ID, the second NF ID, and information relating to the noncompliance of the inter-function communication parameter with the registration communication parameter of the matching communication registration association.

12. The method of claim 8, wherein the inter-function communication parameter includes one or more of a slice domain, a slice/service type, a 5G interface type of a slice in which the NF is executing, a throughput, a latency, an availability, a reliability, a jitter, or a bandwidth for registered communication between the first NF and the second NF.

13. The method of claim 8, wherein the secure storage function is a hyperledger.

14. The method of claim 8, wherein the SSZ function is a virtual network function that manages features of the SSZ.

15. The method of claim 8, wherein the SSZ communication notification response comprises information indicating that a requested communication has been authorized.

16. The method of claim 8, wherein the SSZ communication violation message comprises a notification that a network element is attempting an unregistered communication.

17. The method of claim 8, wherein the first NF is one of a virtual network function or a container network function.

18. The method of claim 1, wherein the SSZ function is a virtual network function that manages features of the SSZ.

19. The method of claim 1, wherein the communication registration response comprises information indicating that a requested communication has been registered.

20. The method of claim 1, wherein the first NF is one of a virtual network function or a container network function.

* * * * *